(12) United States Patent
Parker et al.

(10) Patent No.: US 6,296,016 B1
(45) Date of Patent: Oct. 2, 2001

(54) DOUBLE OBTURATOR VALVE

(75) Inventors: Christopher Jack Parker, Shrewsbury; Peter Alfred Gorman, Telford, both of (GB)

(73) Assignee: BTR plc (GB)

(*) Notice: Subject to any disclaimer, the term of this patent is extended or adjusted under 35 U.S.C. 154(b) by 0 days.

(21) Appl. No.: 09/521,538

(22) Filed: Mar. 8, 2000

Related U.S. Application Data

(63) Continuation of application No. 08/952,161, filed on Nov. 12, 1997, now abandoned.

(51) Int. Cl.$^7$ .............................. E03B 65/20; E03B 31/00
(52) U.S. Cl. .......................... 137/613; 137/628; 251/229
(58) Field of Search .................... 137/613, 628; 251/229

(56) References Cited

U.S. PATENT DOCUMENTS

| | | | |
|---|---|---|---|
| 2,024,905 | * 12/1935 | Bard | 137/613 |
| 2,043,863 | * 6/1936 | Nordstrom | 137/613 |
| 2,048,975 | * 7/1936 | Sproull | 137/613 |
| 2,058,747 | * 10/1936 | Wilkins | 137/613 |
| 2,612,338 | * 9/1952 | Flosdorf et al. | 137/613 |
| 2,690,894 | * 10/1954 | Blevans | 137/613 |
| 3,896,857 | 7/1975 | Turner et al. | 137/628 |
| 4,275,763 | * 6/1981 | Fahrig | 137/613 |
| 4,276,905 | * 7/1981 | Lourdeaux | 137/613 |
| 4,350,322 | * 9/1982 | Mueller | 251/229 |
| 4,498,498 | * 2/1985 | Martinez-Vera et al. | 137/613 |
| 4,846,212 | * 7/1989 | Scobie et al. | 137/240 |
| 4,848,398 | * 7/1989 | Leach | 137/556.3 |
| 5,452,677 | * 9/1995 | Kirkpatrick | 114/333 |
| 5,669,415 | 9/1997 | Trunk | 137/613 |
| 5,685,338 | * 11/1997 | Trunk | 137/613 |

FOREIGN PATENT DOCUMENTS

| | | | |
|---|---|---|---|
| 0 565 243 A1 | 10/1993 | (EP) | F16K/5/22 |
| 829293 | 3/1960 | (GB) . | |
| 850297 | 10/1960 | (GB) . | |
| 915446 | 1/1963 | (GB) . | |
| 918020 | 2/1963 | (GB) . | |
| 1 369 885 | 10/1974 | (GB) | F16K/5/22 |
| 2 131 129A | 6/1984 | (GB) | F16K/3/00 |
| 2 236 829A | 4/1991 | (GB) | F16K/11/22 |
| 2 300 693 | 11/1996 | (GB) | F16K/39/06 |
| 2 305 713 | 4/1997 | (GB) | F16K/27/06 |
| S50-64018 | 6/1975 | (JP) | F16K/5/06 |
| S54-146932 | 10/1979 | (JP) | F16K/5/00 |
| S55-88487 | 6/1980 | (JP) | E03C/1/042 |
| S56-63178 | 5/1981 | (JP) | F16K/35/14 |
| S58-160672 | 10/1982 | (JP) | F16K/5/22 |
| WO 84/00795 | 3/1984 | (WO) | F16K/31/44 |
| WO 97/13085 | 4/1997 | (WO) | F16K/27/06 |

OTHER PUBLICATIONS

API, Specification for Pipeline Valves (Gate, Plug, Ball, and Check Valves), API Specification 6D, Twenty–First Edition, Mar. 31, 1994.

API, Specification for Pipline Valves (Gate, Plug, Ball, and Check Valves), API Specification 6D, Twenty–First Edition, Mar. 31, 1994, Supplement 1 (Dec. 1, 1996).

Taper Plug Valves Pressure Design; Christensens Valve (Brochure).

Lubricated Taper Plug Valves; Product Group; 9 Catalogue No. 184 (Brochure).

AZ Special Plug Valves With Flushing Device; AZ Armaturen (Brochure).

Nordstrom Steel Plug Valves; Nordstrom Valves, Inc. V–102–R2A (Brochures).

Super–H Pressure Balanced Plug Valve; Serck Audco Valves (Brochures).

International Search Report PCT/GB96/02338.

* cited by examiner

*Primary Examiner*—A. Michael Chambers
*Assistant Examiner*—Thomas L. McShane
(74) *Attorney, Agent, or Firm*—Myers Bigel Sibley & Sajovec

(57) ABSTRACT

A valve, for example a tapered plug valve, having two obturators each rotatable between open and closed positions. The angle between the rotational axes is at least about 90° and may be 180°. The handles used to rotate the obturators are preferably on the same side of the valve.

18 Claims, 2 Drawing Sheets

DOUBLE OBTURATOR VALVE

This application is a continuation of application Ser. No. 08/952,161, filed Nov. 12, 1997, now abandoned, the disclosure of which is hereby incorporated herein by reference in its entirety.

This invention relates to a valve.

For various reasons it is sometimes necessary to put valves in series i.e. one after the other in a pipeline. However for valves particularly used in larger diameter pipelines e.g. 12 inches (approximately 300 mm) and greater because of the size of associated actuators, handles and other equipment and often space is limited this is not always readily achievable.

It is an object of the present invention to overcome or at least reduce the effect of this disadvantage.

In accordance with the invention a valve comprises a body having a passageway therethrough for flow of medium, two bores intercepting said passageway, the axes of the bores extending transversely of the passageway and two obturators located one in each of the bores and each rotatable about the axis thereof between a closed position wherein said passageway is blocked and an open position wherein said passageway is unblocked, the axis of one obturator and associated bore being arranged at an angle of at least about 90° with respect to the axis of the other obturator and associated bore.

The axis of said one obturator and associated bore may be arranged at an angle of between 90° and 180° with respect to the axis of said other obturator and associated bore.

The axis of said one obturator and associated bore may be arranged at an angle of 180° with respect to the axis of said other obturator and associated bore, thus said one obturator and associated bore is inverted with respect to said other obturator and associated bore.

Preferably two drive shafts are provided one drive shaft being associated with said one obturator and the other associated with said other obturator, the axis of each drive shaft being the same as the axis of the associated obturator and the axes of the two drive shafts being substantially parallel. One drive shaft preferably extends in one direction and the other preferably in the opposite direction e.g. one extending vertically upwards and the other vertically downwards.

Two rotatable handles may be provided one handle being associated with said one obturator and the other handle associated with said other obturator, each handle being operable to rotate its associated obturator between said closed position and said open position, both handles being located on the same side of the valve.

The valve may comprise two actuators one attached to said one drive shaft through a gear system and the other actuator being attached to said other drive shaft through another gear system. The two actuators may each comprise one of two rotatable handles, both handles being located on the same side of the valve.

The axes of rotation of the two handles may be parallel.

The valve body may comprise two standard flanges each for attachment to pipe work, the longitudinal distance between the flanges being a standard distance e.g. the same as that for a valve comprising only one obturator and associated bore. Examples of relevant standards in use the oil and gas industry and setting out standard distances are API.6D, BS2080, BS5353 and ANSI.B16.10.

One embodiment of the invention will now be described by way of example only with reference to the accompanying drawings of which:

Figure 1:
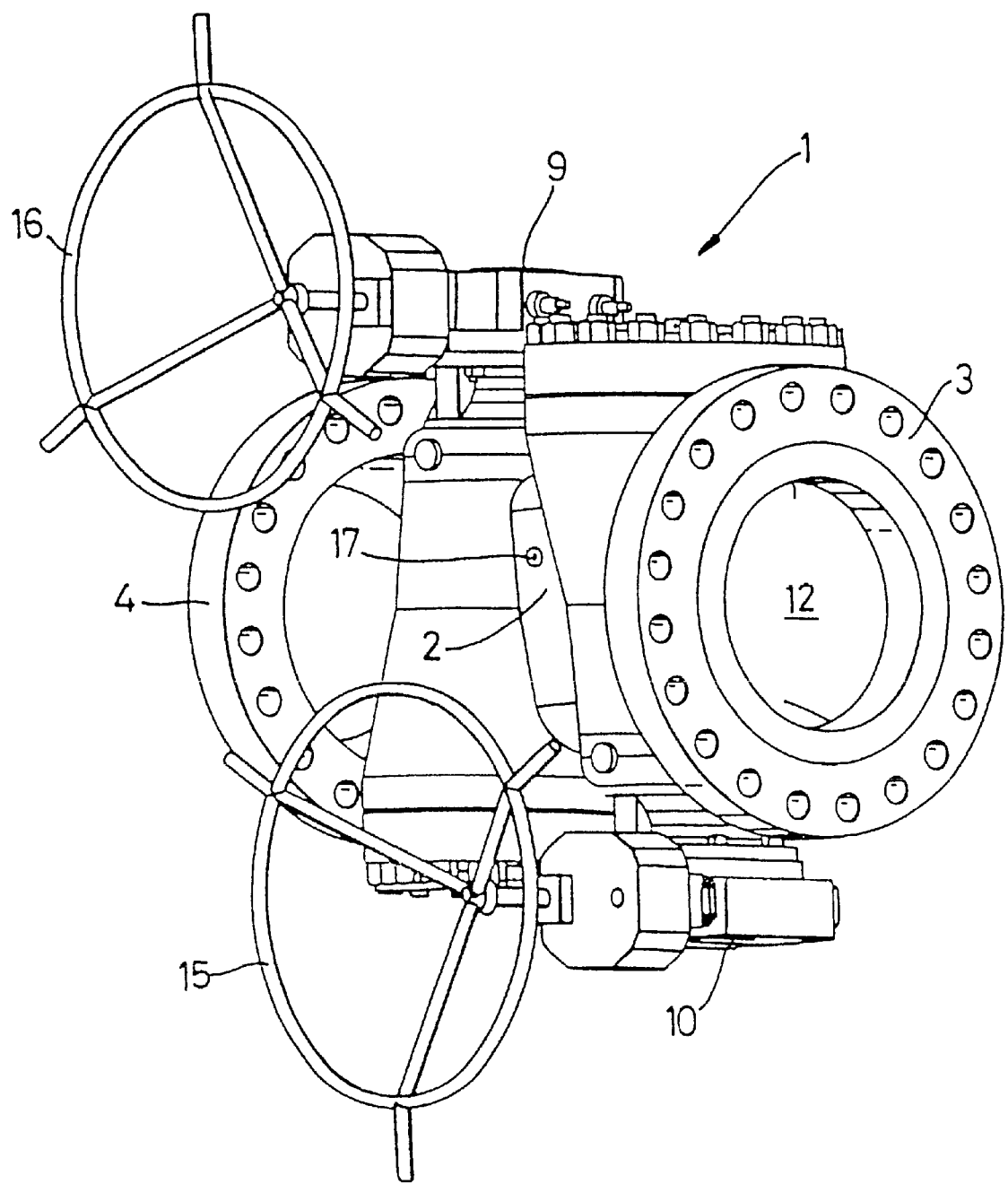
FIG. 1 shows perspective view of a tapered plug valve in accordance with the invention.
Figure 3:
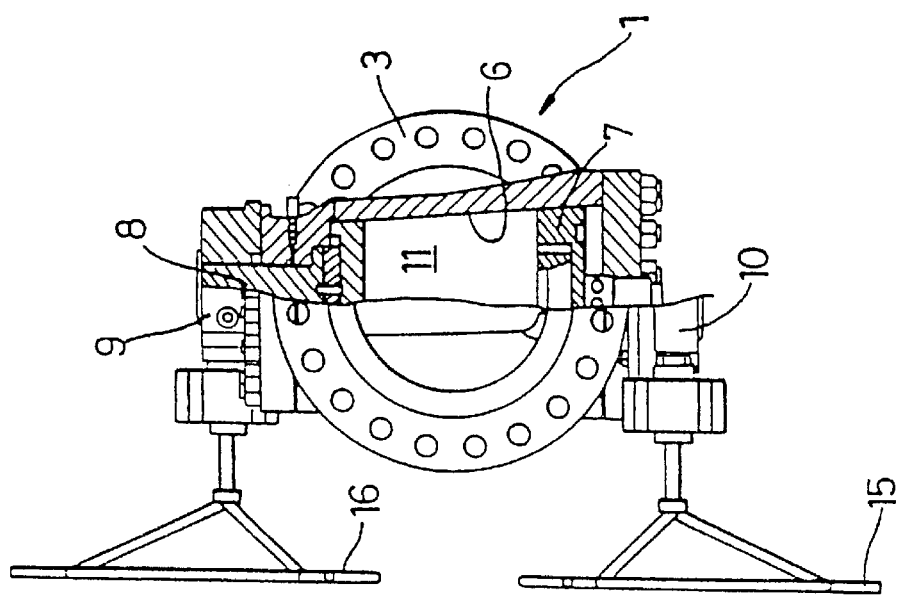
FIG. 3 shows a partial sectional view on section III—III of the valve shown in FIGS. 1 and 2.
Figure 2:
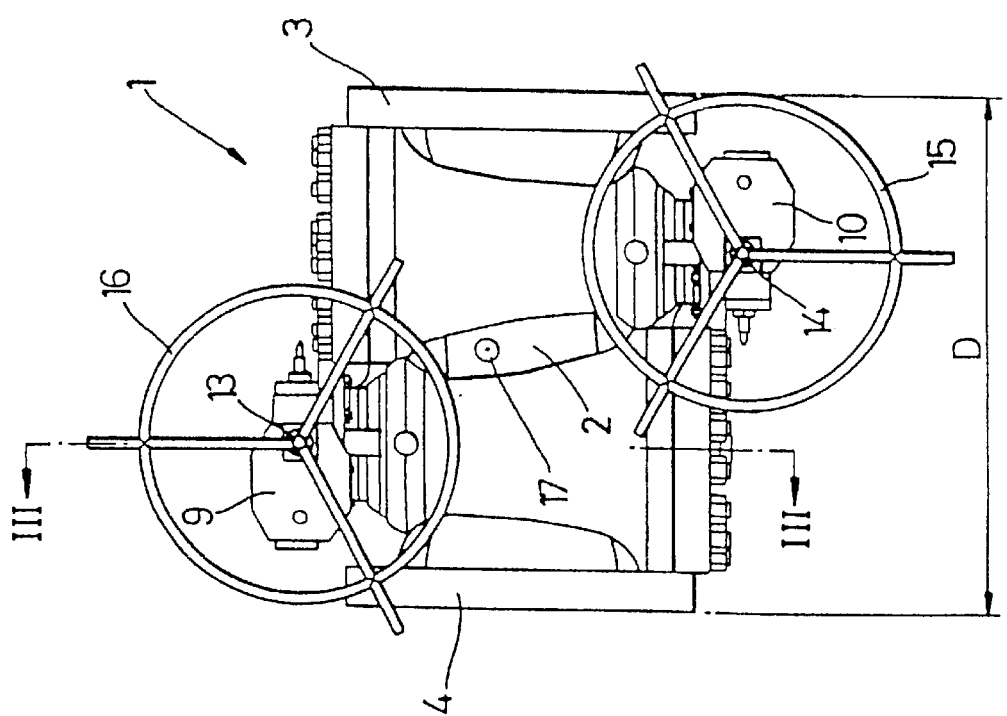
FIG. 2 shows a side view of the valve shown in FIG. 1.

The tapered plug valve 1 comprises a body 2 having two end flanges 3,4 spaced apart by a standard distance D, for fitment to associated pipe work.

A passageway 12 passes through the body 2 and intercepting the passageway are two bores 6 each having a tapered slug 7 therein. Each plug 7 has a port 11 which may be aligned with the passageway 12 in an open condition of the plug 7 or extending at right angles to the passageway 12 in a closed condition of the plug 7.

Each plug 7 has an axis of rotation which extends vertically and the two plug axes are parallel. However one plug and its associated bore is arranged at 180° with respect to the other plug, that is it is inverted with respect to the other plug and associated bore.

Each plug 7 has a drive shaft 8 attached to the narrow end thereof, one extending vertically upwards and the other extending vertically downwards. Attached to each drive shaft is a horizontally disposed actuating shaft 13,14 and associated actuator 9,10. Each actuating shaft has a handle 15,16 attached at the end thereof. Each actuating shaft extends in the same direction from the associated drive shafts and the handles 15,16 are located on the same side of the valve, one, 16, generally, but not vertically, above the other 15.

A venting facility 17 may be provided in the body between the two bores to check the integrity of the upstream obturator seat.

This construction has the advantage that the two handles 15,16 are enabled to be positioned on the same side of the valve because of the inverted arrangement of one plug with respect to the other. This makes it easier for an operator to operate the valves in the limited space which is available.

What is claimed is:

1. A valve comprising:
   a valve body having two standard parallel flanges for attachment to pipework and a passageway therethrough for flow of medium, said valve body including two tapered bores intercepting said passageway, the axes of the bores extending transversely of the passageway;
   two obturators comprising tapered plugs being located one in each of the bores, each plug being rotatable about the restive axis of the bore between a closed position wherein said passageway is blocked and an open position wherein said passageway is unblocked;
   wherein the axis of one of said two obturators and associated bore is arranged at an angle of at least about 90° with respect to the axis of the other of said two obturators and associated bore;
   wherein the flanges are spaced apart by a longitudinal distance which is the same as a standard distance for a valve comprising one obturator and associated bore; and
   wherein the relative orientations of said two obturators and associated bore allows said two obturators and associated bore to occupy a more compact volume than if said axes of said two obturators and associated bore were oriented at the same angle.

2. A valve according to claim 1 wherein the axis of said one obturator and associated bore is arranged at an angle of between 90° and 180° with respect to the axis of said other obturator and associated bore.

3. A valve according to claim 1 wherein the axis of said one obturator and associated bore is arranged at an angle of 180° with respect to the axis of said other obturator and associated bore.

4. A valve according to claim 1 comprising two drive shafts, one drive shaft being associated with said one obturator and the other drive shaft being associated with said other obturator.

5. A valve according to claim 4 wherein the axis of each drive shaft is the same as the axis of the associated obturator and the axes of the two drive shafts are substantially parallel.

6. A valve according to claim 5 wherein one drive shaft extends in one direction and the other drive shaft extends in the opposite direction.

7. A valve according to claim 4 comprising two actuators, one actuator being attached to said one drive shaft through a gear system and other actuator being attached to said other drive shaft through another gear system.

8. A valve system according to claim 7 wherein the actuators each comprise a respective one of two rotatable handles, both handles being located on the same side of the valve.

9. A valve according to claim 1 including two rotatable handles, one handle being associated with said one obturator and the other handle being associated with said other obturator, each handle being operable to rotate its associated obturator between said closed position and said open position, both handles being located on the same side of the valve.

10. A valve system according to claim 9 wherein:

each of said obturators has a narrow end and a wide end opposite said narrow end;

the narrow end of said one obturator is disposed opposite the narrow end of said other obturator; and each of said handles is positioned adjacent the narrow end of the respective associated obturator.

11. A valve system according to claim 9 wherein the axes of rotation of the two handles are substantially parallel.

12. A valve system according to claim 1 including a vent formed in said valve body between said bores.

13. A valve system according to claim 1 wherein said longitudinal distance is defined by one of API Specification 6D, BS2080, BS5353 and ANSI.B16.10.

14. A valve comprising:

a) a valve body including:

a passageway therethrough for flow of medium;

first and second tapered bores intercepting said passageway, said first and second bores having first and second bore axes, respectively, each of said first and second bore axes extending transversely of the passageway;

b) first and second tapered plugs disposed in said first and second bores, respectively, each of said plugs including a port defined therein, a narrow end and a wide end opposite said narrow end, wherein each of said first and second plugs is rotatable about a respective said bore axis between a closed position wherein said passageway is blocked and an open position wherein said passageway is unblocked;

c) first and second handles coupled with and operable to rotate said first and second plugs, respectively;

d) wherein said first bore axis is arranged at an angle of at least about 90° with respect to said second bore axis; and e) wherein said first and second handles are located on the same side of said valve body.

15. A valve system according to claim 14 including first and second actuators coupled with and operable to rotate said first and second plugs, respectively, and wherein said first and second actuators are disposed adjacent said narrow ends of said first and second plugs, respectively.

16. A valve system according to claim 14 wherein said first and second handles are disposed adjacent said narrow ends of said first and second plugs, respectively.

17. A valve system according to claim 14 wherein the axes of rotation of said first and second handles are substantially parallel.

18. A valve system according to claim 14 including a vent formed in said valve body between said bores.

* * * * *

UNITED STATES PATENT AND TRADEMARK OFFICE
CERTIFICATE OF CORRECTION

PATENT NO. : 6,296,016 B1
DATED : October 2, 2001
INVENTOR(S) : Parker et al.

It is certified that error appears in the above-identified patent and that said Letters Patent is hereby corrected as shown below:

<u>Column 2,</u>
Line 12, delete "slug 7" and insert -- plug 7 --.

<u>Column 2, claim 1,</u>
Line 48, delete "restive" and insert -- respective --.
Line 54, delete "bore;" and insert -- bore; and --.

Signed and Sealed this

Ninth Day of April, 2002

Attest:

JAMES E. ROGAN
*Attesting Officer*  *Director of the United States Patent and Trademark Office*